United States Patent [19]
Ramesh

[11] Patent Number: 5,905,743
[45] Date of Patent: May 18, 1999

[54] APPARATUS, METHODS AND COMPUTER PROGRAM PRODUCTS FOR SEQUENTIAL MAXIMUM LIKELIHOOD ESTIMATING COMMUNICATIONS SIGNALS USING WHITENING PATH METRICS

[75] Inventor: Rajaram Ramesh, Cary, N.C.

[73] Assignee: Ericsson Inc., Research Triangle Park, N.C.

[21] Appl. No.: 08/777,823

[22] Filed: Dec. 31, 1996

[51] Int. Cl.⁶ .......................... G06F 11/10; H03M 13/12
[52] U.S. Cl. ...................... 371/43.7; 371/43.6; 371/43.8; 375/341; 375/343
[58] Field of Search ................................ 371/43.7, 43.6, 371/43.8; 375/341, 343, 262

[56] References Cited

U.S. PATENT DOCUMENTS

| | | | |
|---|---|---|---|
| 5,031,195 | 7/1991 | Chevillat et al. | 375/14 |
| 5,537,443 | 7/1996 | Yoshino et al. | 375/340 |
| 5,742,694 | 4/1998 | Eatwell | 381/94.2 |

FOREIGN PATENT DOCUMENTS 0 133 480 A2   2/1985   European Pat. Off. ...... H04L 25/497

OTHER PUBLICATIONS

PCT International Search Report, PCT/US97/23698, May 25, 1998.
Forney, *Maximum–Likelihood Sequence Estimation of Digital Sequences in the Presence of Intersymbol Intereference,* IEEE Transactions on Information Theory, vol. IT–18, No. 3, pp. 363–378.

*Primary Examiner*—Phung M. Chung
*Attorney, Agent, or Firm*—Myers Bigel Sibley & Sajovec

[57] ABSTRACT

An estimate of a first symbol sequence is estimated from a communications signal communicated over a communications channel which imparts noise to the communications signal. The communications signal is received from the communications channel and processed to produce a second symbol sequence. A whitening function is identified, preferably a whitening filter impulse response, and an estimate of the first symbol sequence is sequential maximum likelihood estimated from the second symbol sequence using a path metric including the whitening function. Preferably, candidate symbol sequences are generated for survivor symbol sequences, each candidate symbol sequence including the survivor symbol sequence and an additional symbol postulate. A path metric is determined for each candidate symbol sequence from the candidate symbol sequence, the second symbol sequence, the branch metrics of the symbol postulates in the associated survivor symbol sequence, the whitening filter impulse response, the path metric of the associated survivor symbol sequence and a channel impulse response. At least one new survivor symbol sequence, preferably one with a lesser path metric, is selected from the candidate symbol sequences. The path metric preferably is determined by accumulating branch metrics. Each branch metric preferably is determined by convolving the candidate symbol sequence and the channel impulse response, subtracting the convolution from the second symbol sequence to produce an error sequence, and determining a weighted sum of error sequences for the candidate symbol sequence, weighted according to the whitening filter impulse response. A magnitude of the weighted sum is computed to thereby compute a branch metric.

32 Claims, 7 Drawing Sheets

APPARATUS, METHODS AND COMPUTER PROGRAM PRODUCTS FOR SEQUENTIAL MAXIMUM LIKELIHOOD ESTIMATING COMMUNICATIONS SIGNALS USING WHITENING PATH METRICS

FIELD OF THE INVENTION

The present invention relates to information systems, methods and computer program products, in particular, to apparatus, methods and computer program products for estimating transmitted symbol sequences.

BACKGROUND OF THE INVENTION

In many types of modern communications systems, for example, radiotelephone communications systems, information is communicated using sequences of information symbols, e.g., bits. These symbol sequences typically are transmitted by modulating a radio-frequency carrier signal with the symbol sequence according to various types of pulse-modulation schemes, e.g., frequency-shift keying (FSK), binary phase-shift keying (BPSK), and the like. The modulated carrier signal typically is received at another location, and a complementary demodulator is used to recover the sequence from the modulated carrier signal.

The pulse-modulation techniques used to communicate symbol sequences typically suffer from a form of noise corruption referred to as intersymbol interference (ISI). ISI arises because of characteristics of the communications channel which induce phenomena such as delay spread and dispersion. In addition to ISI, a communications signal may also be subject to noise imparted by the various sources, e.g., interference from other transmission sources in the communications medium, transmitter-induced noise, receiver-induced noise, and the like. The noise in a communications signal often is "colored," i.e., correlated in time.

A well-known technique for producing an estimate of transmitted symbol sequence at a receiver is to process the received signal with a whitening filter and then perform sequential maximum likelihood sequence estimation (SMLSE) on the processed signal to estimate the original transmitted signal, as described in Forney, Jr., "Maximum Likelihood-Sequence Estimation of Digital Sequences in the Presence of Intersymbol Interference," *IEEE Transactions on Information Theory*, Vol. IT-18, No. 3, pp. 363–378 (May 1972). As illustrated in FIG. 1, noisy communications signal 15 representing a symbol sequence 5 transmitted over a communications channel 10 and including additive noise 17 is input to an equalizer 20. In the equalizer 20, the signal 15 is passed through a so-called "whitening" matched filter 22 to produce a signal 23 in which the colored noise of the input signal 15 has been "whitened." The whitened signal 23 is then passed into an estimator 24 which produces an estimate 25 of the transmitted symbol sequence. The estimator 24 typically implements a process known as sequential maximum likelihood sequence estimation (SMLSE), also referred to as the Viterbi algorithm. The estimate 25 produced by the SMLSE performed in the estimator 24 represents an "optimal" estimate of the transmitted symbol sequence, the sense that the Viterbi algorithm produces an optimal estimate of the state sequence of a finite Markov process observed in the presence of memoryless noise, as described in Forney, Jr., "The Viterbi Algorithm," *Proceedings of the IEEE*, Vol. 61, pp. 268–278 (March 1973).

One drawback of this technique, however, is the complexity involved in producing the estimate 25. This complexity is attributable to the channel response of the equalizer 20, which includes the cascade of the whitening filter 22 and the estimator 24. The estimator 24 typically is designed to approximate the behavior of the communications channel 10. The whitening filter 22 typically has a relatively long time response compared to the estimator 24, thus resulting in a more complex and expensive equalizer 20 design.

SUMMARY OF THE INVENTION

In light of the foregoing, it is an object of the present invention to provide estimating apparatus, methods and computer program products which can produce accurate estimates of transmitted symbol sequences from communications signals including colored noise in a manner which is less complex than conventional systems and methods.

It is another object of the present invention to provide estimating apparatus, methods and computer program products which are less complex than conventional sequence estimation systems and methods.

These and other objects, features and advantages are provided according to the present invention by apparatus, methods and computer program products in which a symbol sequence represented by a communications signals received from a communications channel is estimated by sequential maximum likelihood sequence estimation (SMLSE) using a path metric including a whitening function. The whitening function preferably corresponds to the impulse response of a whitening filter for whitening colored noise in the communications signal. Preferably, the coefficients of the whitening filter impulse response are used as weighting factors in computing a branch metric representing a weighted sum of error sequences for candidate sequences representing possible extensions of survivor sequences at each stage of a Viterbi estimating procedure. Because the coefficients of the whitening filter are used in determining path metrics for SMLSE instead of using a whitening filter to preprocess the received signal, the complexity and computational delay associated with the estimating apparatus can be reduced.

In particular, according to the present invention, an estimate of a first symbol sequence is estimated from a communications signal representing the first symbol sequence, the communications signal communicated over communications channel which imparts noise to the communications signal, by receiving the communications signal from the communications channel and processing the received communications signal to produce a second symbol sequence. A whitening function which whitens noise imparted by the communications channel is identified, and an estimate of the first symbol sequence sequential maximum likelihood estimated from the second symbol sequence using a path metric including the whitening function. Preferably, the whitening function identified is a whitening filter impulse response for a whitening filter which whitens colored noise in a signal input into the whitening filter, and the step of sequential maximum likelihood estimating includes sequential maximum likelihood estimating an estimate of the first symbol sequence from the second symbol sequence using a path metric including branch metrics weighted according to the whitening filter impulse response.

According to one aspect of the present invention, sequential maximum likelihood estimating includes determining survivor symbol sequences, each survivor symbol sequence including at least one symbol postulate of a symbol in the first symbol sequence and having an associated path metric representing an error of the survivor symbol sequence with respect to the first symbol sequence, each symbol postulate in a survivor symbol sequence having an associated branch metric representing an incremental error associated with adding the symbol postulate to the survivor symbol sequence. Candidate symbol sequences are generated for each survivor symbol sequence, each candidate symbol sequence the survivor symbol sequence and an additional symbol postulate. A path metric is determined for each candidate symbol sequence from the candidate symbol sequence, the second symbol sequence, the branch metrics of the symbol postulates in the associated survivor symbol sequence, the whitening filter impulse response, the path metric of the associated survivor symbol sequence and a channel impulse response of the communications channel. At least one new survivor symbol sequence is selected from the candidate symbol sequences according to the path metrics of the candidate symbol sequences. The steps of generating candidate symbol sequences, determining a path metric for each candidate symbol sequence, and selecting at least one new survivor symbol sequence from the candidate symbols sequences are repeatedly performed to produce an estimate of the first symbol sequence. Preferably, the step of determining a path metric for each candidate symbol sequence comprises the step of determining a path metric for each candidate symbol sequence, each path metric having a magnitude associated therewith, and the step of selecting at least one survivor symbol sequence comprises the step of selecting at least one candidate symbol sequence having a path metric of lesser magnitude.

According to another aspect of the present invention, a path metric for a candidate sequence is determined by determining a branch metric for the candidate symbol sequence from the candidate symbol sequence, the channel impulse response, the second symbol sequence, the whitening filter impulse response and the stored branch metrics for the associated survivor symbol sequence, and adding the branch metric determined for the candidate symbol sequence to the path metric for the associated survivor symbol sequence to thereby compute a path metric for each candidate symbol sequence. Preferably, the branch metric is determined by convolving the candidate symbol sequence and the channel impulse response, subtracting the convolution of the candidate symbol sequence and the channel impulse response from the second symbol sequence to produce an error sequence, computing a weighted sum of error sequences for the candidate symbol sequence, the weighted sum weighted according to the whitening filter impulse response, and determining a magnitude of the weighted sum to thereby compute a branch metric for the candidate symbol sequence. Efficient and accurate estimates of symbol sequences are thereby provided.

BRIEF DESCRIPTION OF THE DRAWINGS

Some of the objects and advantages of the present invention having been stated, others will be more fully understood from the detailed description that follows and by reference to the accompanying drawings in which.

DETAILED DESCRIPTION OF PREFERRED EMBODIMENTS

Figure 1:
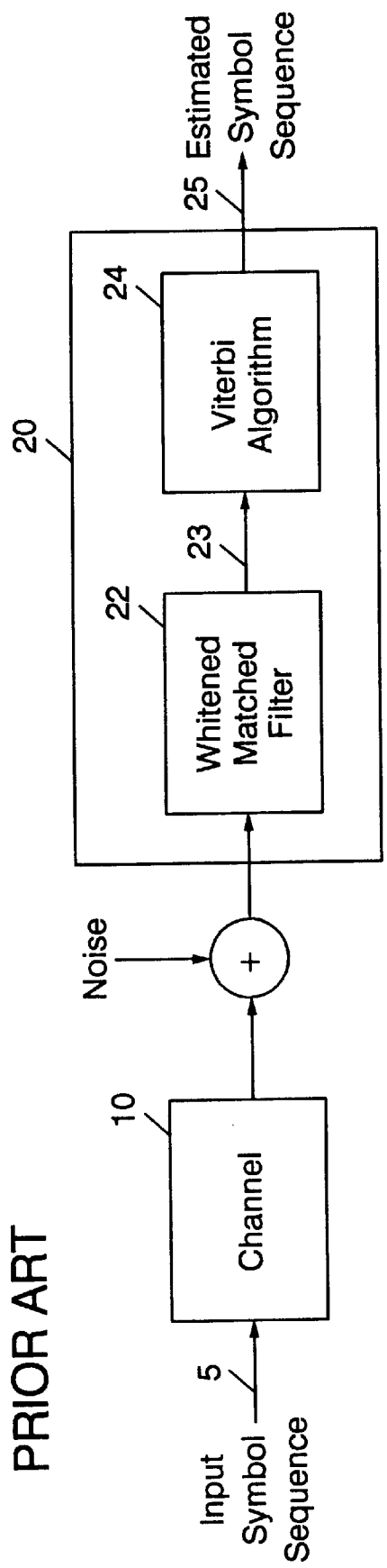
FIG. 1 is a block diagram illustrating estimation of a symbol sequence in the presence of colored noise according to the prior art.

The present invention now will be described more fully hereinafter with reference to the accompanying drawings, in which embodiments of the invention are shown. Although one of the embodiments illustrated relates to a radiotelephone communications system application, those skilled in the art will appreciate that this invention may be embodied in many different forms and should not be construed as limited to the embodiments and applications set forth herein; rather, these embodiments are provided so that this disclosure will be thorough and complete, and will fully convey the scope of the invention to those skilled in the art. In the drawings, like numbers refer to like elements throughout.

Figure 2:
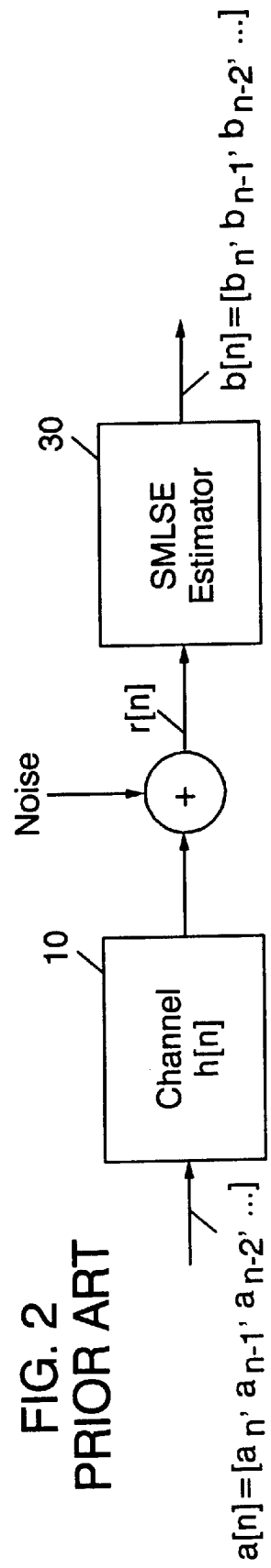
FIG. 2 is a block diagram illustrating sequential maximum likelihood sequence estimation according to the prior art.
Figure 3:
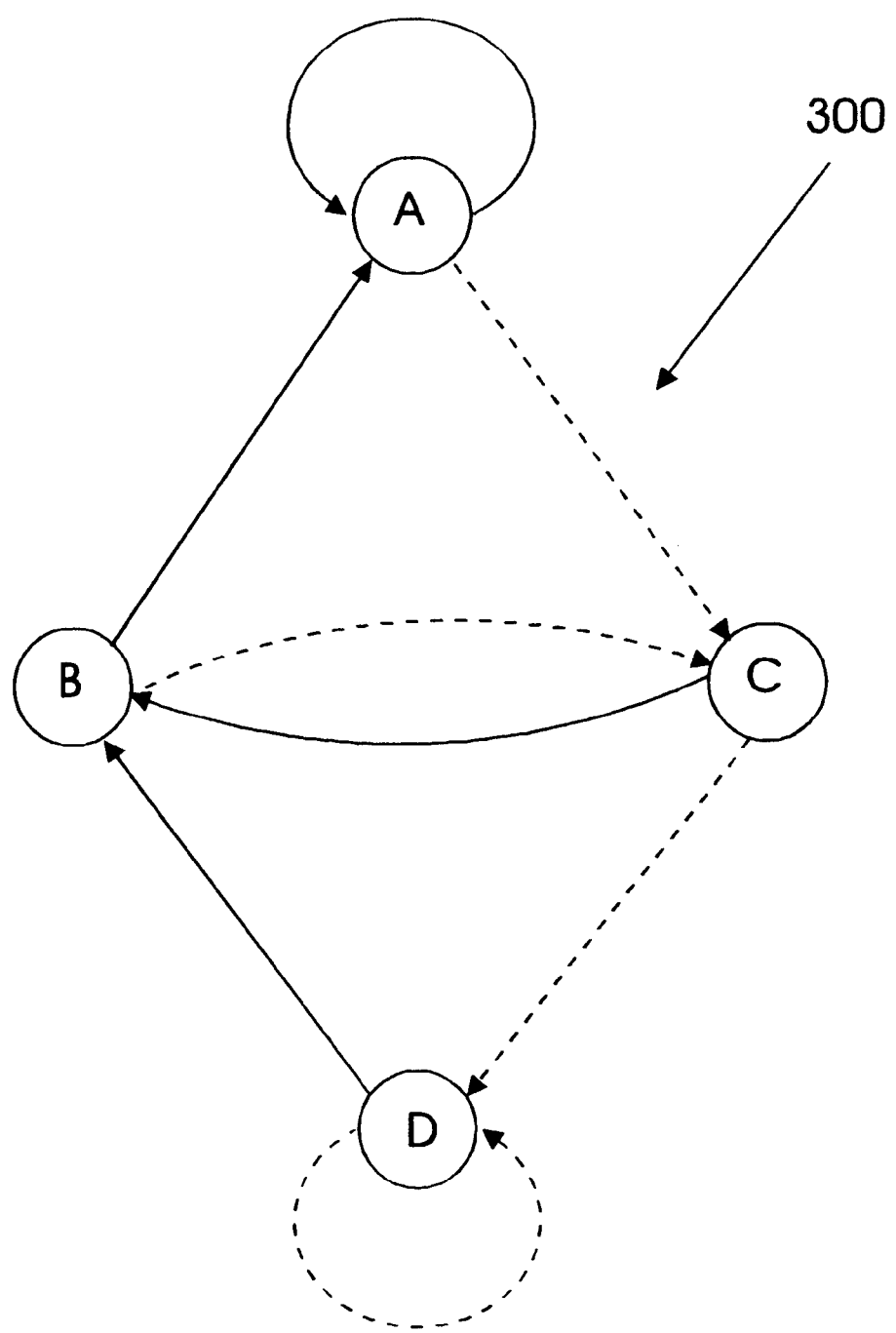
FIG. 3 is a state diagram illustrating state transitions for a Markov process.
Figure 4:
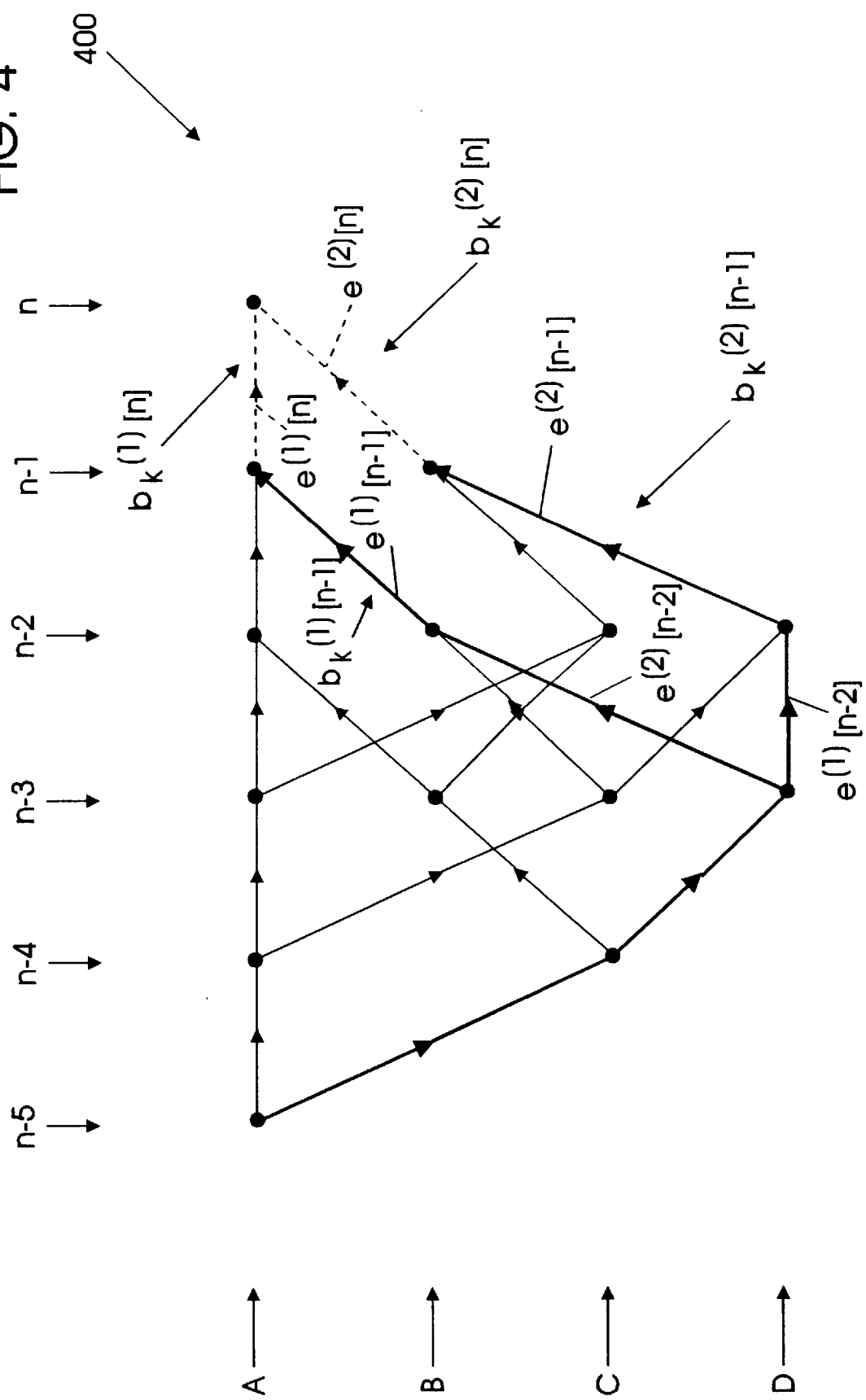
FIG. 4 is a trellis diagram illustrating state transitions for a Markov process.

Referring now to FIG. 2, a received signal r[n] is received from a communications channel 10 having an impulse response h[n], the received signal r[n] representing a first symbol sequence $[a_n, a_{n-1}, \ldots]$. A SMLSE estimator 30 produces a postulated sequence $[b_n, b_{n-1}, \ldots]$ representing an estimate of the first symbol sequence $[a_n, a_{n-1}, \ldots]$. The operation of the SMLSE estimator can be explained with reference to state and trellis diagrams, as shown in FIGS. 3 and 4, respectively. In FIG. 3, the characteristics of a communications channel 200 can be represented as state diagram 300 for a finite-state Markov process. The state diagram 300 has four possible states A–D. The possible state transitions of the process are indicated by arrows, corresponding to transitions which occur when a new symbol is input into the channel. Referring to FIG. 4, a trellis diagram 400 may be used to represent the state transitions of the channel 200. The trellis 400 is assumed to begin at an initial state A at a time n−5. The trellis also includes possible transitions among the states A–D at times n−4–n, indicated by arrows. As those skilled in the art will appreciate the state diagram and trellis may be of varying order, dependent on the characteristics of the channel 200.

As will be understood by those skilled in the art, the SMLSE estimator prunes potential paths, i.e., potential symbol sequences, from the trellis diagram 400 based on stepwise determination of a path metric which provides a measure of the relative likelihood that a sequence in the path corresponds to the original transmitted sequence, given the received signal r[n] and the channel impulse response h[n]. The path metric typically is constructed by computing a branch metric for each state transition in a path and accumulating the branch metrics for a path to produce the path metric for that path. After the algorithm has progressed to a final state at time n, the path with the lowest accumulated path metric remains.

For a given transition from one of the states A–D, a branch metric may be generated corresponding to a distance, for example, a Euclidean distance, between the received signal r[n] and the convolution of the postulated sequence $[b_n, b_{n-1}, \ldots]$ and the channel impulse response h[n]:

$$M_1 = \left| r[n] - \sum b_k h[n-k] \right|^2$$
$$= |e[n]|^2$$

where e[n] denotes an error signal along the branches of the original trellis.

If, however, the received signal r[n] is first passed through a whitening filter with impulse response w[n], this branch metric becomes:

$$M_2 = |(r[n]*w[n]) - \Sigma b_k t[n-k]|^2$$

where * represents a convolution and t[n] represents the impulse response of the cascade of h[n] and w[n]. Since:

$$\Sigma b_k t[n-k] = (\Sigma b_k h[n-k])*w[n],$$

the branch metric $M_2$ can be written as:

$$M_2 = \left| \left(r[n] - \sum b_k h[n-k]\right) * w[n] \right|$$
$$= |e[n]*w[n]|^2$$

Thus, in lieu of passing a communications signal through a whitening filter before Viterbi estimating, a way of producing an estimate of the symbol sequence represented by the communications signal without direct use of a whitening filter is to Viterbi decode using a branch metric derived by passing the error signal of the trellis through the whitening filter.

However, as one of the purposes of using the Viterbi algorithm typically is to reduce storage requirements by pruning branches entering a particular node which have higher path metrics and retaining the branches into a state which have the lowest accumulated path metric, often referred to as "survivors", it generally is not desirable to retain the error signal for all states on all paths. Therefore, according to another aspect of the present invention, a modified branch metric may be used which includes only information from surviving paths. Referring to FIG. 4, two survivor sequences, $b_k^{(1)}[n]$, $b_k^{(2)}[n]$ are shown entering state A at a time n from two different states A,B. For the branches entering the state A from the states A,B, first and second error sequences may be computed:

$$e^{(1)}[n] = r[n] - \Sigma_j b_j^{(1)} h[n-k]$$

and $$e^{(2)}[n] = r[n] - \Sigma_j b_j^{(2)} h[n-k].$$

The error sequences for other branches on the paths are indicated by $e^{(1)}[n-1]$, $e^{(1)}[n-2]$ and $e^{(2)}[n-1]$, $e^{(2)}[n-2]$. If the coefficients of the impulse response of the whitening filter w[n] are given by $w_0$, $w_1$, and $w_2$, modified path metrics for the branches according to the present invention may be given by:

$$M^{(1)} = |w_0 e^{(1)}[n] + w_1 e^{(1)}[n-1] + w_2 e^{(1)}[n-2]|^2$$

and $$M^{(2)} = |w_0 e^{(2)}[n] + w_1 e^{(2)}[n-1] + w_2 e^{(2)}[n-2]|^2.$$

The accumulated path metrics for the paths are determined by adding the branch metrics to the existing path metrics:

$$A^{(1)} = A(s_1) + M^{(1)}$$

and $$A^{(2)} = A(s_2) + M^{(2)}.$$

The path into the state with the lowest path metric can then be chosen to survive at the end of the stage. Although the estimate produced may not be optimal in the sense of an estimate produced by Viterbi estimating after processing with a whitening filter, the present invention may produce an estimate which approaches optimality with a simpler structure than a cascaded whitening filter and SMLSE estimator.

Figure 5:
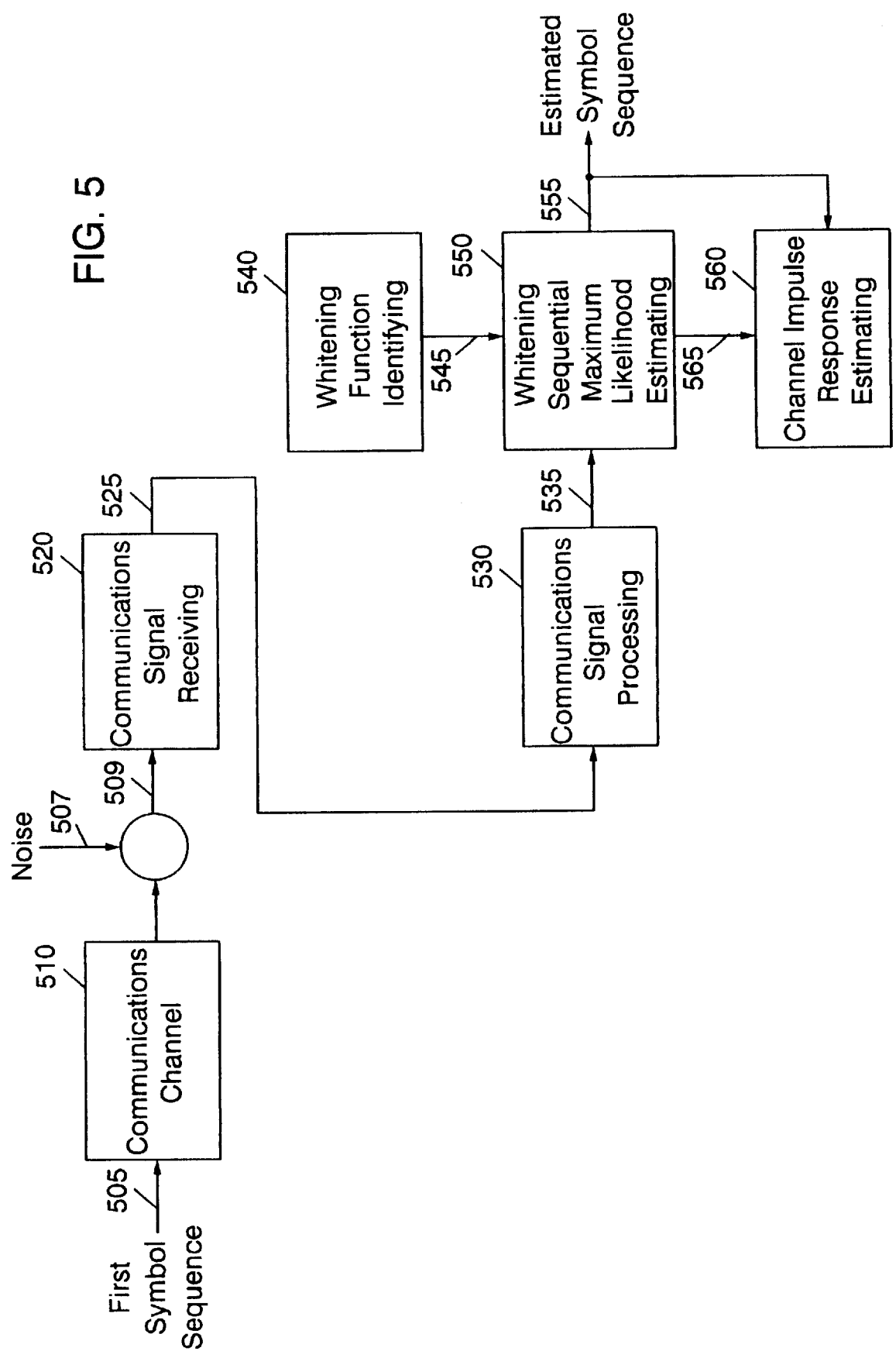
FIG. 5 is a block diagram illustrating an apparatus for estimating a symbol sequence from a communications signal according to the present invention.

FIG. 5 illustrates an apparatus for estimating an estimate 555 of a first symbol sequence 505 from a communications signal 509 according to the present invention. The first symbol sequence is communicated over a communications channel 510 and received as a communications signal 509 including noise 507 at communications signal receiving means 520. Communications signal processing means 530 processes the received communications signal 525 and produces a second symbol sequence 535. Whitened sequential maximum likelihood sequence estimating means 550 produces an estimate 555 of the first symbol sequence 505 using a path metric including a whitening function 545 identified by whitening function identifying means 540. Preferably, a channel impulse response 565 is produces by channel impulse response estimating means 560 and used by the sequential maximum likelihood sequence estimating means 550. Those skilled in the art will also understand that the communications signal receiving means 520, the communications signal processing means 530, the whitening function identifying means 540, the whitened sequential maximum likelihood sequence estimating means 550 and the channel impulse response estimating means 560 can be implemented in a number of different ways, including by special purpose hardware, by software running on general or special purpose data processors, and by combinations thereof.

Figure 6:
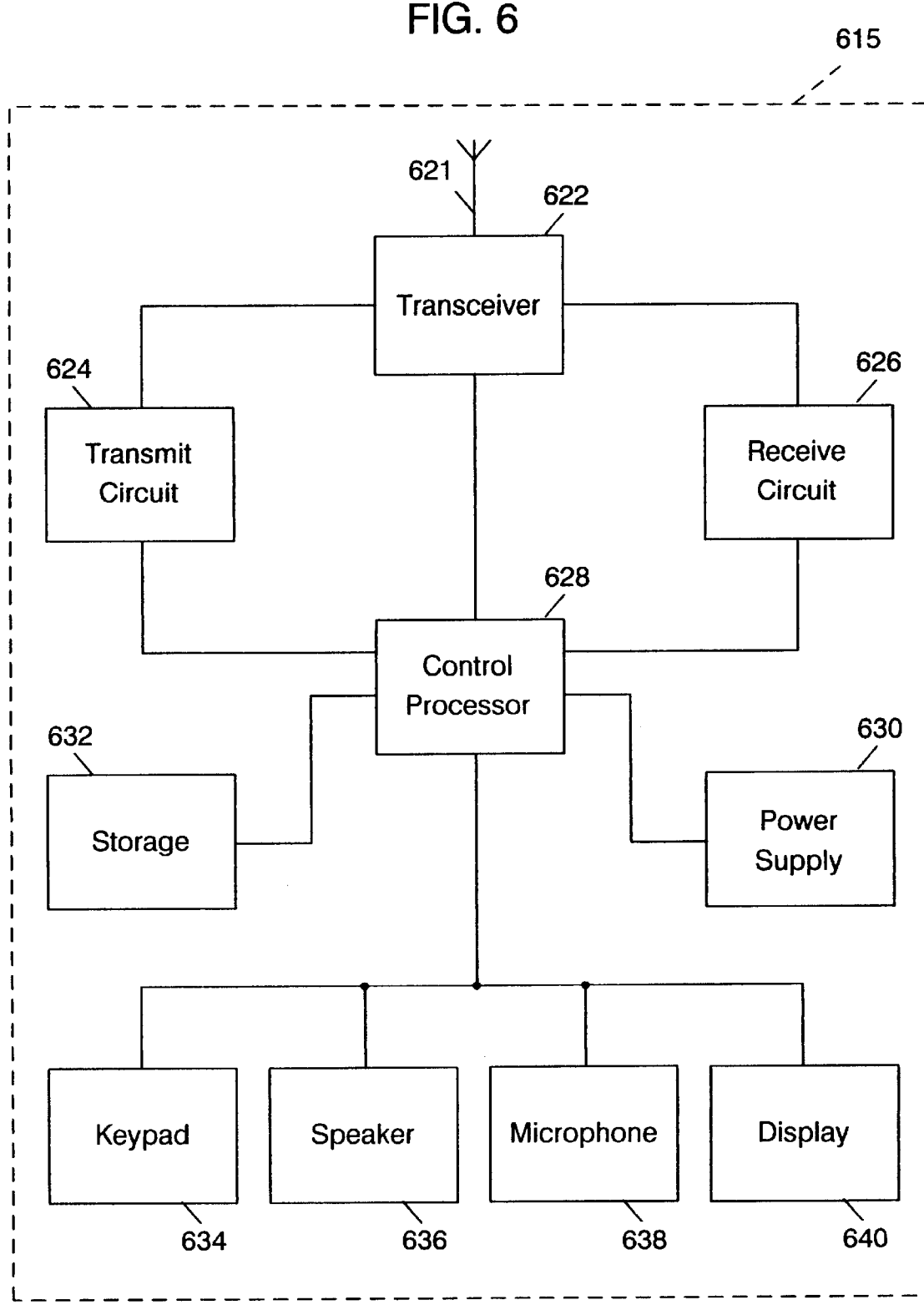
FIG. 6 is a block diagram illustrating a communications receiver for estimating a symbol sequence from a received communications signal according to the present invention.

For example, FIG. 6 illustrates a mobile communications unit 615 in which the methods, apparatus and computer program products according to the present invention may be embodied. As seen in FIG. 6, the mobile terminal 615 includes an antenna 621 connected to a transceiver 622 for transmitting and receiving communications signals. The transceiver 622 is controlled by a control processor 628. Information to be transmitted by transceiver 622 is processed by transmit circuit 624 which provides transmit signal processing. Similarly, information received by transceiver 622 is processed by receive circuit 626 which provides receive signal processing. Each of these circuits is also controlled by control processor 628 which has associated with it memory or other storage means 632 for storing data or processor instructions. Mobile terminal 615 also includes a power supply 630 which typically operates from a rechargeable battery, or other such portable power storage device. Control processor 628 may selectively provide power from power supply 630 to other components of the mobile terminal 615, such as transmit circuit 624, receive circuit 626 and transceiver 622, so as to reduce power consumption as described herein. Mobile terminal 615 may also include input and output devices such as a keypad 634, a speaker 636, a microphone 638 and a display 640 operatively associated with the control processor 628 for interacting with a user.

Figure 7:
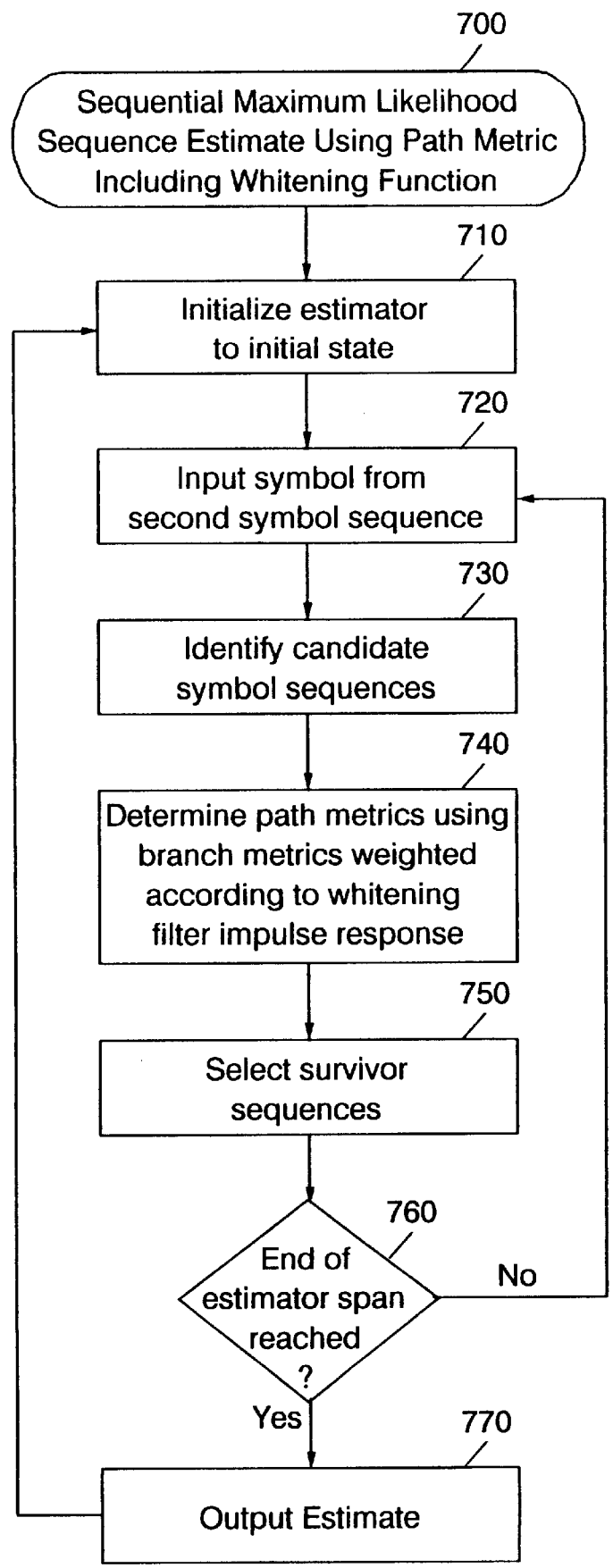
FIG. 7 is a flowchart illustration of operations for estimating a symbol sequence from a received communications signal according to the present invention.
Figure 8:
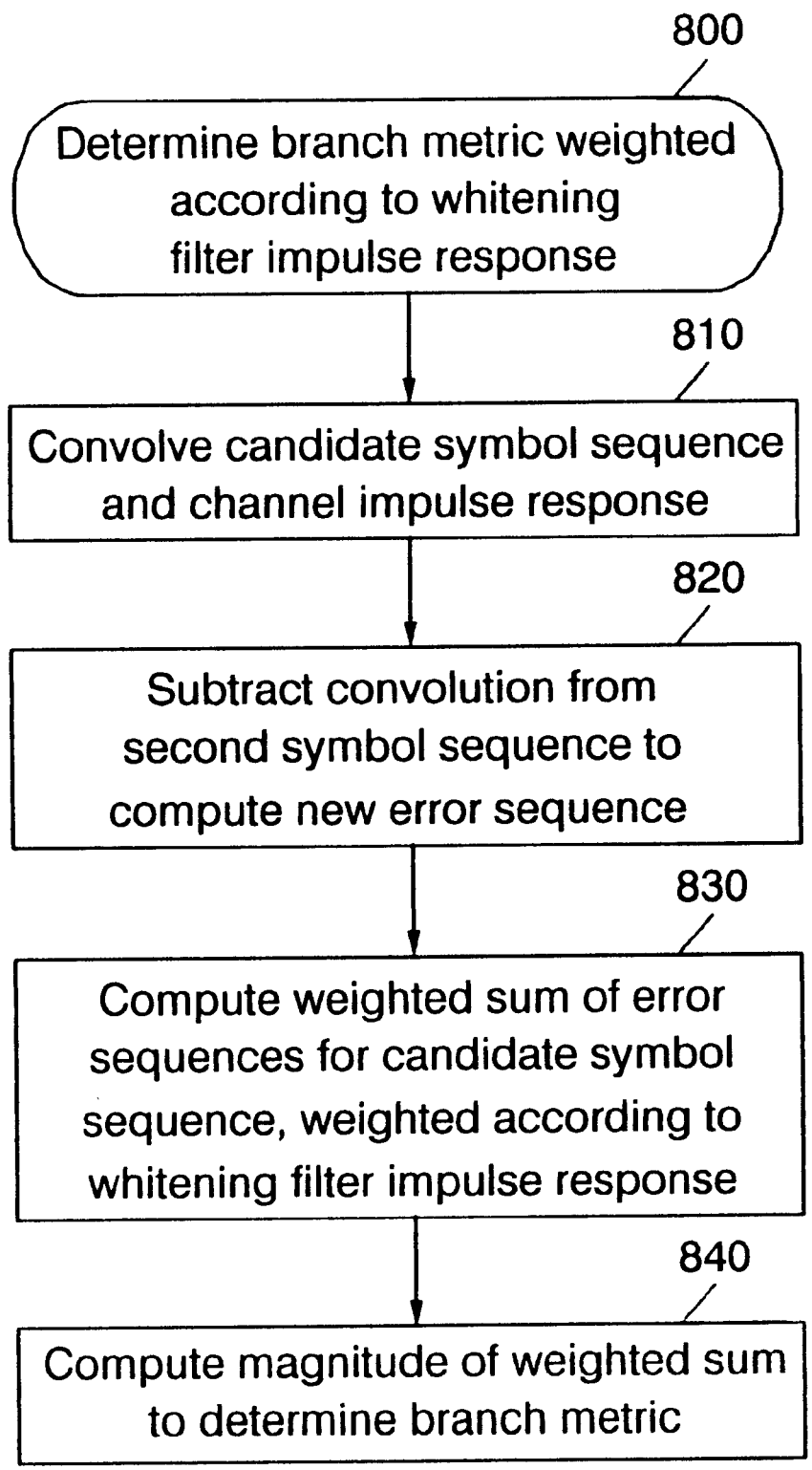
FIG. 8 is a flowchart illustration of operations for determining a branch metric according to the present invention.

FIGS. 7 and 8 are flowchart illustrations of methods, apparatus and computer program products according to the invention. It will be understood that each block of the flowchart illustrations, and combinations of blocks in the flowchart illustrations, can be implemented by computer program instructions. These computer program instructions may be loaded into a computer or other programmable data processing apparatus, such as an equalizer in the receive 626 of the mobile unit 615 illustrated in FIG. 6, to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks, for example, the memory 632 associated with the control processor 628 of the mobile unit 615 of FIG. 6. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

FIG. 7 illustrates operations for sequential maximum likelihood sequence estimating using a path metric including a whitening function (Block 700). Preferably, the estimator is initialized to an initial state (Block 710). A symbol from the second symbol sequence 535 is input into the estimator (Block 720). Candidate symbol sequences are identified (Block 730), each representing an extension of the initial state by a postulated symbol, i.e., possible state transitions from the initial state to other states due to the input symbol from the second symbol sequence. Path metrics are determined for the candidate symbol sequences (Block 740), preferably from branch metrics weighted according to the impulse response of an identified whitening filter. Survivor sequences are then selected from the candidate sequences based on the determined path metrics (Block 750), preferably by selecting, for each state, the entering candidate sequence having the lowest path metric. If the end of the estimator span is not yet reached (Block 760), a new symbol is input into the estimator (Block 720) and the operations of identifying candidate sequences (Block 730), determining path metrics for the new candidate sequences (Block 740), and selecting new survivor sequences (Block 750) is repeated. When the end of the estimator span is reached (Block 760), the estimate may be output (Block 770) and the estimating operation started over again (Block 710). Those skilled in the art will appreciate that decisions can alternatively be produced by tracing back along the trellis paths to a predetermined decision depth, instead of along the entire path history.

FIG. 8 illustrates operations for determining a branch metric for a candidate sequence, weighted according to a whitening filter impulse response (Block 800). A convolution of the candidate sequence and the channel impulse response is determined (Block 810) and subtracted from the second symbol sequence to compute an error sequence for the candidate sequence (Block 820). A weighted sum of the error sequences for the candidate sequence is computed, weighted according to the whitening function impulse response (Block 830), preferably using the coefficients of the whitening function impulse response as weighing factors, as described above. The magnitude of the weighted sum is computed to determined the branch metric for the candidate sequence (Block 840). Those skilled in the art will appreciate that "magnitude" according to the present invention may include "sum of squares," "squared magnitude" or similar measures.

Those skilled in the art will appreciate that operations according to the present invention can be performed in varying ways, for example, by changing the order and sequence of computations. Those skilled in the art will also understand, that the apparatus, methods, and computer programs according to the invention are not limited to telecommunications applications, and that the present invention is applicable to a wide variety of other information applications where it is desirable to produce an estimate of a symbol sequence from another sequence which is received from a channel which can be described in terms of Markov processes and is corrupted by noise, in particular, colored noise. For example, the apparatus, methods and computer program products of the present invention may be used in character and other pattern recognition applications, convolutional and other coding applications, and the like.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A method of determining an estimate of a first symbol sequence from a communications signal representing the first symbol sequence, the communications signal communicated over communications channel which imparts noise to the communications signal, the method comprising the steps of:

receiving the communications signal from the communications channel;

processing the received communications signal to produce a second symbol sequence;

identifying a whitening function which whitens noise imparted by the communications channel; and sequential maximum likelihood estimating an estimate of the first symbol sequence from the second symbol sequence using a path metric including the whitening function.

2. A method according to claim 1:

wherein said step of identifying a whitening function comprises the step identifying a whitening filter impulse response for a whitening filter which whitens colored noise in a signal input into the whitening filter; and wherein said step of sequential maximum likelihood estimating comprises the step of sequential maximum likelihood estimating an estimate of the first symbol sequence from the second symbol sequence using a path metric including branch metrics weighted according to the whitening filter impulse response.

3. A method according to claim 2, wherein said step of sequential maximum likelihood estimating comprises the steps of:

determining survivor symbol sequences, each survivor symbol sequence including at least one symbol postulate of a symbol in the first symbol sequence and having an associated path metric representing an error of the survivor symbol sequence with respect to the first symbol sequence, each symbol postulate in a survivor symbol sequence having an associated branch metric representing an incremental error associated with adding the symbol postulate to the survivor symbol sequence;

generating candidate symbol sequences for each survivor symbol sequence, each candidate symbol sequence including the survivor symbol sequence and an additional symbol postulate;

determining a path metric for each candidate symbol sequence from the candidate symbol sequence, the second symbol sequence, the branch metrics of the symbol postulates in the associated survivor symbol sequence, the whitening filter impulse response, the path metric of the associated survivor symbol sequence and a channel impulse response of the communications channel;

selecting at least one new survivor symbol sequence from the candidate symbol sequences according to the path metrics of the candidate symbol sequences; and repeating said steps of generating candidate symbol sequences, determining a path metric for each candidate symbol sequence, and selecting at least one new survivor symbol sequence from the candidate symbols sequences to produce an estimate of the first symbol sequence.

4. A method according to claim 3:

wherein said step of sequential maximum likelihood estimating is by the step of estimating the channel impulse response from an estimate of a symbol sequence.

5. A method according to claim 3:

wherein said step of determining a path metric for each candidate symbol sequence comprises the step of determining a path metric for each candidate symbol sequence, each path metric having a magnitude associated therewith; and wherein said step of selecting at least one survivor symbol sequence comprises the step of selecting at least one candidate symbol sequence having a path metric of lesser magnitude.

6. A method according to claim 3 wherein said step of determining a path metric for each candidate symbol sequence comprises the steps of:

determining a branch metric for the candidate symbol sequence from the candidate symbol sequence, the channel impulse response, the second symbol sequence, the whitening filter impulse response and the stored branch metrics for the associated survivor symbol sequence; and adding the branch metric determined for the candidate symbol sequence to the path metric for the associated survivor symbol sequence to thereby compute a path metric for the candidate symbol sequence.

7. A method according to claim 6 wherein said step of determining a branch metric for each of the candidate symbol sequences comprises the steps of:

convolving the candidate symbol sequence and the channel impulse response;

subtracting the convolution of the candidate symbol sequence and the channel impulse response from the second symbol sequence to produce an error sequence for the candidate symbol sequence;

computing a weighted sum of error sequences for the candidate symbol sequence, the weighted sum weighted according to the whitening filter impulse response; and determining a magnitude of the weighted sum to thereby compute a metric for the candidate symbol sequence.

8. A method of estimating a first symbol sequence from a second symbol sequence received from a channel and corrupted by noise, the method comprising the steps of:

identifying a whitening function which whitens the noise which corrupts the communications channel; and sequential maximum likelihood estimating an estimate of the first symbol sequence from the second symbol sequence using a path metric including the whitening function.

9. A method according to claim 8, wherein the noise is colored noise, and:

wherein said step of identifying a whitening function comprises the step of identifying a whitening filter impulse response of a whitening filter which whitens the colored noise; and wherein said step of sequential maximum likelihood estimating comprises the step of sequential maximum likelihood estimating an estimate of the first symbol sequence from the second symbol sequence using a path metric including branch metrics weighted according to the whitening filter impulse response.

10. A method according to claim 9, wherein said step of sequential maximum likelihood estimating comprises the steps of:

determining survivor symbol sequences, each survivor symbol sequence including at least one symbol postulate of a symbol in the first symbol sequence and having an associated path metric representing an error of the survivor symbol sequence with respect to the first symbol sequence, each symbol postulate in a survivor symbol sequence having an associated branch metric representing an incremental error associated with adding the symbol postulate to the survivor symbol sequence;

generating candidate symbol sequences for each survivor symbol sequence, each candidate symbol sequence including the survivor symbol sequence and an additional symbol postulate;

determining a path metric for each candidate symbol sequence from the candidate symbol sequence, the second symbol sequence, the branch metrics of the symbol postulates in the associated survivor symbol sequence, the whitening filter impulse response, the path metric of the associated survivor symbol sequence and a channel impulse response for the channel;

selecting at least one new survivor symbol sequence from the candidate symbol sequences according to the path metrics of the candidate symbol sequences; and repeating said steps of generating candidate symbol sequences, determining a path metric for each candidate symbol sequence, and selecting at least one new survivor symbol sequence from the candidate symbols sequences to produce an estimate of the first symbol sequence.

11. A method according to claim 10:

wherein said step of determining a path metric for each candidate symbol sequence comprises the step of determining a path metric for each candidate symbol sequence, each path metric having a magnitude associated therewith; and wherein said step of selecting at least one survivor symbol sequence comprises the step of selecting at least one candidate symbol sequence having a path metric of lesser magnitude.

12. A method according to claim 10 wherein said step of determining a path metric for each candidate symbol sequence comprises the steps of:

determining a branch metric for the candidate symbol sequence from the candidate symbol sequence, the channel impulse response, the second symbol sequence, the whitening filter impulse response and the stored branch metrics for the associated survivor symbol sequence; and adding the branch metric determined for the candidate symbol sequence to the path metric for the associated survivor symbol sequence to thereby compute a path metric for the candidate symbol sequence.

13. A method according to claim 12 wherein said step of determining a branch metric for each of the candidate symbol sequences comprises the steps of:

convolving the candidate symbol sequence and the channel impulse response;

subtracting the convolution of the candidate symbol sequence and the channel impulse response from the second symbol sequence to produce an error sequence;

computing a weighted sum of error sequences for the candidate symbol sequence, the weighted sum weighted according to the whitening filter impulse response; and determining a magnitude of the weighted sum to thereby compute a branch metric for the candidate symbol sequence.

14. An apparatus for estimating a first symbol sequence from a communications signal representing the first symbol sequence, the communications signal communicated over communications channel which imparts noise to the communications signal, the apparatus comprising:

communications signal receiving means for receiving the communications signal from the communications channel;

communications signal processing means, responsive to said communications signal receiving means, for processing the received communications signal to produce a second symbol sequence;

whitening function identifying means for identifying a whitening function which whitens the noise imparted by the communications channel; and whitening sequential maximum likelihood estimating means, responsive to said communications signal processing means and to said whitening function identifying means, for sequential maximum likelihood estimating an estimate of the first symbol sequence from the second symbol sequence using a path metric including the whitening function.

15. An apparatus according to claim 14, wherein the noise is colored noise, and:

wherein said whitening function identifying means comprises means for identifying a whitening filter impulse response of a whitening filter which whitens the colored noise; and wherein said whitening sequential maximum likelihood estimating means comprises means for sequential maximum likelihood estimating an estimate of the first symbol sequence from the second symbol sequence using a path metric including branch metrics weighted according to the whitening filter impulse response.

16. An apparatus according to claim 15, wherein said whitening sequential maximum likelihood estimating means comprises:

means for determining survivor symbol sequences, each survivor symbol sequence including at least one symbol postulate of a symbol in the first symbol sequence, each survivor symbol sequence having an associated path metric representing an error of the survivor symbol sequence with respect to the first symbol sequence, each symbol postulate in a survivor symbol sequence having an associated branch metric representing an incremental error associated with adding the symbol postulate to the survivor symbol sequence;

means, responsive to said means for determining survivor symbol sequences, for generating candidate symbol sequences for each survivor symbol sequence, each candidate symbol sequence including the survivor symbol sequence and an additional symbol postulate;

means, responsive to said means for generating candidate symbol sequences, for determining a path metric for each candidate symbol sequence from the candidate symbol sequence, the second symbol sequence, the branch metrics of the symbol postulates in the associated survivor symbol sequence, the whitening filter impulse response, the path metric of the associated survivor symbol sequence and a channel impulse response of the communications channel; and means, responsive to said means for determining a path metric for each candidate symbol sequence, for selecting at least one new survivor symbol sequence from the candidate symbol sequences according to the path metrics of the candidate symbol sequences.

17. An apparatus according to claim 16, further comprising channel impulse response means, responsive to said whitening sequential maximum likelihood estimating means, for estimating the channel impulse response from an estimate of a symbol sequence.

18. An apparatus according to claim 16:

wherein said means for determining a path metric for each candidate symbol sequence comprises means for determining a path metric for each candidate symbol sequence, each path metric having a magnitude associated therewith; and wherein said means for selecting at least one survivor symbol sequence comprises means for selecting at least one candidate symbol sequence having a path metric of lesser magnitude.

19. An apparatus according to claim 16 wherein said means for determining a path metric for each candidate symbol sequence comprises:

means for determining a branch metric for the candidate symbol sequence from the candidate symbol sequence, the channel impulse response, the second symbol sequence, the whitening filter impulse response and the stored branch metrics for the associated survivor symbol sequence; and means, responsive to said means for determining a branch metric, for adding the branch metric determined for the candidate symbol sequence to the path metric for the associated survivor symbol sequence to thereby compute a path metric for the candidate symbol sequence.

20. An apparatus according to claim 19 wherein said means for determining a branch metric for each of the candidate symbol sequences comprises:

means for convolving the candidate symbol sequence and the channel impulse response;

means, responsive to said means for convolving the candidate symbol sequence and the channel impulse response, for subtracting the convolution of the candidate symbol sequence and the channel impulse response from the second symbol sequence to produce an error sequence;

means, responsive to said means for subtracting, for computing a weighted sum of the error sequences, the weighted sum weighted according to the whitening filter impulse response; and means, responsive to said means for computing a weighted sum, for determining a magnitude of the weighted sum to thereby compute a branch metric for the candidate symbol sequence.

21. An apparatus for estimating a first symbol sequence from a second symbol sequence received from a channel and corrupted by noise, the apparatus comprising:

whitening function identifying means for identifying a whitening function which whitens the noise; and whitening sequential maximum likelihood estimating means, responsive to said means for identifying a whitening function, for sequential maximum likelihood estimating an estimate of the first symbol sequence from the second symbol sequence using a path metric including the whitening function.

22. An apparatus according to claim 21, wherein the noise is colored noise, and:

wherein said whitening function identifying means for identifying a whitening function comprises means for identifying a whitening filter impulse response of a whitening filter which whitens the colored noise; and wherein said whitening sequential maximum likelihood estimating means comprises means for sequential maximum likelihood estimating the second symbol sequence using a path metric including branch metrics weighted according to the whitening filter impulse response.

23. An apparatus according to claim 22, wherein said whitening sequential maximum likelihood estimating means comprises:

means for determining survivor symbol sequences, each survivor symbol sequence including at least one symbol postulate of a symbol in the first symbol sequence and having an associated path metric representing an error of the survivor symbol sequence with respect to the first symbol sequence, each symbol postulate in a survivor symbol sequence having an associated branch metric representing an incremental error associated with adding the symbol postulate to the survivor symbol sequence;

means, responsive to said means for determining survivor symbol sequences, for generating candidate symbol sequences for each survivor symbol sequence, each candidate symbol sequence including the survivor symbol sequence and an additional symbol postulate;

means, responsive to said means for generating candidate symbol sequences, for determining a path metric for each candidate symbol sequence from the candidate symbol sequence, the second symbol sequence, the branch metrics of the symbol postulates in the associated survivor symbol sequence, the whitening filter impulse response, the path metric of the associated survivor symbol sequence and an channel impulse response for the channel; and means, responsive to said means for determining a path metric for each candidate symbol sequence, for selecting at least one new survivor symbol sequence from the candidate symbol sequences according to the path metrics of the candidate symbol sequences.

24. An apparatus according to claim 23:

wherein said means for determining a path metric for each candidate symbol sequence comprises means for determining a path metric for each candidate symbol sequence, each path metric having a magnitude associated therewith; and wherein said means for selecting at least one survivor symbol sequence comprises means for selecting at least one candidate symbol sequence having a path metric of lesser magnitude.

25. An apparatus according to claim 23 wherein said means for determining a path metric for each candidate symbol sequence comprises:

means for determining a branch metric for the candidate symbol sequence from the candidate symbol sequence, the channel impulse response, the second symbol sequence, the whitening filter impulse response and the stored branch metrics for the associated survivor symbol sequence; and means, responsive to said means for determining a branch metric, for adding the branch metric determined for the candidate symbol sequence to a path metric for the associated survivor symbol sequence to thereby compute a path metric for the candidate symbol sequence.

26. An apparatus according to claim 25 wherein said means for determining a branch metric for each of the candidate symbol sequences comprises:

means for convolving the candidate symbol sequence and the channel impulse response;

means, responsive to said means for convolving the candidate symbol sequence and the channel impulse response, for subtracting the convolution of the candidate symbol sequence and the channel impulse response from the second symbol sequence to produce an error sequence;

means, responsive to said subtracting means, for computing a weighted sum of the error sequences, the weighted sum weighted according to the whitening filter impulse response; and means, responsive to said means for computing a weighted sum, for determining a magnitude of the weighted sum to thereby compute a branch metric for the candidate symbol sequence.

27. A computer program product according to claim 21, wherein the noise is colored noise, and:

wherein said first computer-readable program code means comprises third computer-readable program code means for identifying a whitening filter impulse response of a whitening filter which whitens the colored noise; and wherein said second computer-readable program code means comprises fourth computer-readable program code means for sequential maximum likelihood estimating the second symbol sequence using a path metric including branch metrics weighted according to the whitening filter impulse response.

28. A computer program product according to claim 27, wherein said second computer-readable program code means comprises:

fifth computer-readable program code means for determining survivor symbol sequences, each survivor symbol sequence including at least one symbol postulate of a symbol in the first symbol sequence and having an associated path metric representing an error of the survivor symbol sequence with respect to the first symbol sequence, each symbol postulate in a survivor symbol sequence having an associated branch metric representing an incremental error associated with adding the symbol postulate to the survivor symbol sequence;

sixth computer-readable program code means, responsive to said fifth computer-readable program code means, for generating candidate symbol sequences for each survivor symbol sequence, each candidate symbol sequence including the survivor symbol sequence and an additional symbol postulate;

seventh computer-readable program code means, responsive to said sixth computer-readable program code means, for determining a path metric for each candidate symbol sequence from the candidate symbol sequence, the second symbol sequence, the branch metrics of the symbol postulates in the associated survivor symbol sequence, the whitening filter impulse response, the path metric of the associated survivor symbol sequence and an channel impulse response for the channel; and eighth computer-readable program code means, responsive to said seventh computer-readable program code means, for selecting at least one new survivor symbol sequence from the candidate symbol sequences according to the path metrics of the candidate symbol sequences.

29. A computer program product according to claim 28:

wherein said seventh computer-readable program code means comprises ninth computer-readable program code means for determining a path metric for each candidate symbol sequence, each path metric having a magnitude associated therewith; and wherein said eighth computer-readable program code means comprises tenth computer-readable program code means for selecting at least one candidate symbol sequence having a path metric of lesser magnitude.

30. A computer program product according to claim 28 wherein said seventh computer-readable program code means comprises:

eleventh computer-readable program code means for determining a branch metric for the candidate symbol sequence from the candidate symbol sequence, the channel impulse response, the second symbol sequence, the whitening filter impulse response and the stored branch metrics for the associated survivor symbol sequence; and twelfth computer-readable program code means, responsive to said eleventh computer-readable program code means, for adding the branch metric determined for the candidate symbol sequence to a path metric for the associated survivor symbol sequence to thereby compute a path metric for the candidate symbol sequence.

31. A computer program product according to claim 30 wherein said seventh computer-readable program code means comprises:

thirteenth computer-readable program code means for convolving the candidate symbol sequence and the channel impulse response;

fourteenth computer-readable program code means, responsive to said thirteenth computer-readable program code means, for subtracting the convolution of the candidate symbol sequence and the channel impulse response from the second symbol sequence to produce an error sequence;

fifteenth computer-readable program code means for means, responsive to said fourteenth computer-readable program code means, for computing a weighted sum of error sequences for the candidate symbol sequence, the weighted sum weighted according to the whitening filter impulse response;

sixteenth computer-readable program code means, responsive to said fifteenth computer-readable program code means, for determining a magnitude of the convolution of the error sequence and the whitening filter impulse response to thereby compute a branch metric for the candidate symbol sequence.

32. A computer program product for estimating a first symbol sequence from a second symbol sequence received from a channel and corrupted by noise, the computer program product comprising:

a computer-readable storage medium having computer-readable program code means embodied in said medium, said computer-readable program code means comprising:

first computer-readable program code means for identifying a whitening function which whitens the noise; and second computer-readable program code means, responsive to said first computer-readable program code means, for sequential maximum likelihood estimating an estimate of the first symbol sequence from the second symbol sequence using a path metric including the whitening function.

* * * * *

UNITED STATES PATENT AND TRADEMARK OFFICE
CERTIFICATE OF CORRECTION

PATENT NO. : 5,905,743
DATED : May 18, 1999
INVENTOR(S) : Rajaram Ramesh

It is certified that error appears in the above-identified patent and that said Letters Patent is hereby corrected as shown below:

Column 10, Line 8, following "compute a" please insert -- branch --.
Column 10, Line 58, please delete "path•metric" and substitute -- path metric -- therefor.
Column 13, Line 66, please delete "an" and substitute -- a -- therefor.
Column 15, Line 24, please delete "an" and substitute -- a -- therefor.

Signed and Sealed this

Eleventh Day of April, 2000

Attest:

Q. TODD DICKINSON

Attesting Officer

Director of Patents and Trademarks